(12) United States Patent
Glatzel et al.

(10) Patent No.: US 8,544,352 B2
(45) Date of Patent: Oct. 1, 2013

(54) SENSOR ARRANGEMENT INCLUDING A BRACKET FOR MOUNTING A PROBE

(75) Inventors: Michael Glatzel, Wuppertal (DE); Jörg Kube, Marl (DE); Marc Rhode, Hamburg (DE); Andreas Seidel, Duisburg (DE)

(73) Assignee: KROHNE Messtechnik GmbH, Duisburg (DE)

( * ) Notice: Subject to any disclaimer, the term of this patent is extended or adjusted under 35 U.S.C. 154(b) by 416 days.

(21) Appl. No.: 12/956,346

(22) Filed: Nov. 30, 2010

(65) Prior Publication Data

US 2011/0252881 A1 Oct. 20, 2011

(30) Foreign Application Priority Data

Apr. 20, 2010 (DE) .......................... 10 2010 015 813

(51) Int. Cl.
*G01D 21/00* (2006.01)
*G01F 1/68* (2006.01)

(52) U.S. Cl.
USPC .................. 73/866.5; 73/204.23; 73/204.22

(58) Field of Classification Search
None
See application file for complete search history.

(56) References Cited

U.S. PATENT DOCUMENTS

| | | | | |
|---|---|---|---|---|
| 4,326,422 A | * | 4/1982 | Kobayashi et al. | 73/861.22 |
| 4,480,467 A | | 11/1984 | Harter et al. | |
| 4,568,874 A | * | 2/1986 | Kramer et al. | 73/304 C |
| 4,569,228 A | * | 2/1986 | Bellgardt et al. | 73/866.5 |
| 4,624,146 A | * | 11/1986 | Nakagawa | 73/861.66 |
| 5,257,532 A | * | 11/1993 | Hayakawa et al. | 73/75 |
| 5,437,194 A | * | 8/1995 | Lynnworth | 73/861.27 |
| 5,880,365 A | | 3/1999 | Olin et al. | |
| 6,508,134 B1 | * | 1/2003 | Feller | 73/861.27 |
| 6,557,417 B1 | * | 5/2003 | Liu | 73/714 |
| 6,802,217 B2 | * | 10/2004 | Dennison | 73/204.11 |
| 6,883,389 B2 | * | 4/2005 | Eldridge | 73/861.65 |

FOREIGN PATENT DOCUMENTS

| | | |
|---|---|---|
| DE | 694 10 061 T3 | 1/2005 |
| DE | 20 2005 013 904 U1 | 3/2006 |
| DE | 20 2008 011 995 U1 | 12/2008 |
| EP | 1 074 825 A1 | 2/2001 |
| FR | 1 419 811 A | 12/1965 |
| GB | 1 219 710 | 1/1971 |
| GB | 2 134 266 A | 8/1984 |

* cited by examiner

*Primary Examiner* — Harshad R Patel
(74) *Attorney, Agent, or Firm* — Roberts Mlotkowski Safran & Cole, P.C.; David S. Safran

(57) ABSTRACT

A sensor arrangement including a probe and a bracket that are provided for a calorimetric mass flow meter for measuring the mass flow in a measuring tube. The probe is mounted in the bracket in such a manner that the probe is guided essentially without contact with a radial spacing through a probe recess a wall of the measuring tube and is positioned in a cross section of a flow-through area of the flow of the measuring tube. The bracket is designed in such a manner that the probe is thermally de-coupled from the measuring tube. The sensor arrangement for the calorimetric mass flow meter is capable of increasing the measuring accuracy and increasing the flexibility during operation.

9 Claims, 5 Drawing Sheets

SENSOR ARRANGEMENT INCLUDING A BRACKET FOR MOUNTING A PROBE

BACKGROUND OF THE INVENTION

1. Field of the Invention

The invention relates to a sensor arrangement for a calorimetric mass flow meter for measuring the mass flow in a measuring tube, and more particularly, to a sensor arrangement including at least one probe, wherein the probe can be positioned in the cross section of a flow of the measuring tube.

2. Description of Related Art

Arrangements for calorimetric mass flow measurement are known in a plurality of designs from the related art. Calorimetric flow meters are used for determining the flow of fluids, e.g., liquids or gases in piping systems, and are exceptionally suitable for measurements at lower flow speeds. The calorimetric flow measurement is suitable preferably for determining the mass flow since this is immediately proportional to the measuring signal. The heat flow $\dot{Q}$ is an essential variable for the determination of the mass flow, which is emitted by a heated sensor to the flowing fluid and is dissipated from the fluid. This dissipated heat flow is consistent with the expended electric calorific output, which can then be used, for example, as a measuring variable. In practice, two methods of measurement are normally distinguished.

A first method is the so-called cool-down method, in which the flowing fluid cools down the heated probe inserted into the cross section of flow of the measuring tube, wherein the temperature difference between the temperature of the fluid and the probe temperature is kept constant. The required calorific output for the constant temperature difference is the variable for determining the mass flow.

A second method is the so-called heat-up method, in which the heat flow emitted by the heated probe increases the temperature of the fluid at a second probe positioned downstream, wherein the increase in temperature $\Delta T$ at constant calorific output is a variable for determining the mass flow. In the second method, the increase in temperature $\Delta T$ can also be alternatively kept constant by adjusting the calorific output so that the required calorific output can be used as a variable for the mass flow.

A further distinguishing feature for calorimetric mass flow meters known from the related art is the positioning of the probe or, respectively of the probes. Depending on the method of measurement, for example, two probes are arranged next to one another, orthogonal to the direction of flow, wherein one of the two probes is heated and the other measures a reference temperature. A second possibility, which is used in particular for the warm-up method, is that one probe is positioned upstream and one probe further downstream, wherein, in particular, the probe positioned upstream is heated and the probe positioned downstream measures the increase in temperature of the flowing fluid. Alternatively, the arrangement of the heated and un-heated probe can be inverted in respect to the direction of flow, wherein, the probe located upstream measures the reference temperature and the probe located downstream emits a calorific output to the flowing medium.

It is known from the related art that the mounting of the probes on the measuring tube occurs using a threaded connection, in which the probe can be screwed in and positioned in the cross section of the flow. Screwing the probes into the connections of the measuring tube offers the advantage that the probes can be easily removed, for example, for maintenance. However, it is disadvantageous in that the probes and the connections have to be directly adjusted to one another, and thus this type of mounting leads to limited flexibility during an operation, for example when replacing a probe.

The sensor arrangements known from the related art have the further disadvantage that due to the heat transfer between the probes and the measuring tube, an influence occurs on the emitted heat flow or, respectively on the measured temperature, through which the measurement results are falsified and the quality of the measurement results is decreased.

SUMMARY OF THE INVENTION

Based on the problems known from the related art, it is a primary object of the present invention is to provide a sensor arrangement for a calorimetric mass flow meter, which guarantees an increased accuracy in measurement and increased flexibility during operation.

The above object is met with a sensor arrangement including a bracket, wherein the probe is mounted in the bracket in such a manner that the probe is guided essentially without contact with a radial spacing through at least one probe recess in the wall of the measuring tube. The probe in the mounted state is positioned in the cross section of flow of the measuring tube. The bracket is designed in such a manner that the probe is thermally de-coupled from the measuring tube.

The sensor arrangement according to the invention has the advantage that no or only a very small heat flow can occur from the probe to the wall of the measuring tube or from the wall of the measuring tube onto the probe, since the probe is thermally de-coupled from the measuring tube.

In an aspect of the invention, the probe is mounted on the outer side of the measuring tube in the bracket and is inserted into the cross section of flow through a probe recess in the wall of the measuring tube. The probe is positioned in the probe recess in such a manner that it does not come into contact with the wall of the measuring tube and has no direct contact, wherein the radial spacing between the probe and the wall of the measuring tube can be very small. The probe is preferably arranged through the bracket in its longitudinal direction so that its tip is positioned exactly in the central axis of the cross section of flow of the measuring tube, through which optimum measuring results can be achieved.

Using brackets of different design, e.g., using brackets with different thicknesses or geometric shapes, the positioning of the probe can be influenced or can be adapted to different operation conditions. In this manner, for example, probes having different lengths are used in a measuring tube with a constant diameter, in which positioning of the probes occurs via the geometry of the bracket. Depending on the diameter of the probe recess, probes with varying diameters can also be mounted with corresponding brackets. However, the probe is only mounted in the bracket, which guarantees a thermal de-coupling of the probe. Consequently, heat flow between the probe and the wall of the measuring tube is prevented or minimized.

Preferably at least one seal is arranged between the bracket and the wall of the measuring tube in order to prevent the leaking of a medium flowing in the cross section of flow through the probe recess, in particular through the ring gap.

According to another aspect of the invention, at least two probes are mounted in a bracket in order to guarantee a measurement of the reference temperature at the same limiting conditions. A first probe can be heated in at least one head section and a second probe is suitable for measuring temperature. Both probes are arranged either next to one another or one after the other in the flow channel depending on the chosen method of evaluation. The heatable probe is arranged either downstream or upstream from the measuring probe depending on the method of measurement.

A separate probe recess is provided in the measuring tube for each probe, through which each probe is inserted into the cross section of flow of the measuring tube without the probe touching either the wall of the probe recess or the measuring tube. Both probes are mounted in a single, common bracket, so that the relative position of both probes is defined in the cross section of flow by the bracket or by the probe recess. The bracket de-couples both probes thermally from one another and also de-couples both probes thermally from the measuring tube.

A first of the two probes can be heated at least in a head section so that the probe emits a heat flow in the head section into the fluid flowing around it. Depending on the use, it is provided, that the probe can be heated not only in the head section, but also in a larger section or even over its entire length.

The second of the two probes is equipped, for example, with a temperature-measuring resistor or a thermal element and is used for measuring a reference temperature, for example, the temperature of the fluid.

Normally, the first and the second probe each have the same length so that they have a same penetration depth into the cross section of the flow, preferably up to directly on a level of the central axis of the cross section of the flow. The characteristic of thermal conductivity of the probes is essentially homogeneous, for example, over its entire length. Alternatively different characteristics of thermal conductivity can be provided over the longitudinal length of the probes.

According to another aspect of the invention, it has been shown to be advantageous for permanently positioning the bracket on the measuring tube when the bracket can be mounted on the outer surface of the measuring tube. In particular, the measuring tube is provided with a bevel in a mounting area for mounting the bracket. The bracket is, by way of non-limiting example, tightly screwed to the wall of the measuring tube using screws, so that a stable and reliable mounting of the bracket and a safe positioning of the probe is guaranteed. Alternatively, it is also provided that the bracket itself is not directly mounted on the measuring tube, but instead is indirectly mounted using a mounting element that is mounted directly to the measuring tube. The bracket is held force-fit or form-fit to the mounting element.

Since a mounting of the bracket on a curved surface of the measuring tube is complex, it is preferred that the measuring tube is beveled in the mounting area for mounting the bracket, such that an even surface is available for mounting the bracket. The probe recess stretches from the mounting area through the wall of the measuring tube into the cross section of the flow, wherein the probe recess is aligned preferably orthogonal to the even surface of the mounting area. Because of the mounting area, the wall thickness of the measuring tube is partially reduced, and it should be taken into consideration that a sufficient wall thickness remains for safe operation of the mass flow meter.

The bracket is preferably essentially flat against the mounting surface and is in contact with the measuring tube in such a manner that no fluid can escape from the measuring tube through the probe recess. A sealing connection has been shown to be advantageous for this aspect of the invention.

In an alternative aspect of the invention, at least one part of the bracket extends partially into the wall of the measuring tube in the mounted state in order to simplify the position of the probe in the probe recess. The bracket has a molding, e.g., a cylindrical molding, which extends into a corresponding recess in the wall of the measuring tube. Preferably a through-hole in the bracket for the probe also runs centrally in the recess. The recess continues into the wall of the measuring tube, preferably as probe recess, so that the probe is held in the bracket in the area of the molding and an exact positioning of the probe within the probe recess is ensured through the exact positioning of the molding in the corresponding recess in the wall of the measuring tube.

According to another aspect of the invention, it is provided that the bracket is designed with multiple parts. For example, the bracket can include a base plate and a number of sockets corresponding to a number of probes. In particular, the sockets can be at least partially form-fit into corresponding socket recesses in the base plate. Preferably, the sockets are designed rotationally symmetric so that they can be inserted in a simple circular socket recess in the base plate. More preferably, it is also provided that the outer contour of the base plate is designed rotationally symmetric. The sockets consequently aid in mounting and holding the probe, wherein different probes with different diameters can be inserted in a base plate by replacing the sockets.

According to another aspect of the invention, the sockets can be placed at least partially in corresponding recesses in the base plate as well as in the wall of the measuring tube in order to design the mounting of the probes to be more reliable, in particular, to dampen vibration occurring due to the flow. In accordance with alternative aspects, the sockets and corresponding recesses are arranged so that the sockets represent a connecting member between the base plate and the wall of the measuring tube. The sockets also have through-holes, which correspond to the outer diameter of the used probes, so that the probes can be reliably attached in the sockets. Preferably, the recess in the wall of the measuring tube corresponding to each socket is exactly coaxially positioned to the probe recess or, respectively, proceeds as probe recess, so that the socket guarantees an exact positioning of the probe in the probe recess.

The socket with the probe attached, in the mounted state, extends beyond the preferably partially beveled outer contour of the measuring tube so that a base plate can be fit on the socket or sockets, through which the sockets are affixed by the base plate. The socket extends at least partially into a corresponding recess, i.e., a socket recess, in the base plate so that a form-fit connection is created. The base plate itself is mounted, by way of non-limiting example, with a screw on the wall of the measuring tube or is held by a mounting element and is flat against the preferably beveled outer surface of the measuring tube. In this instance, different probes can also be used by changing the sockets.

It is preferably provided that the bracket is comprised of a material that is a poor heat conductor, e.g., more preferably a plastic, in order to guarantee a thermal de-coupling of the probes from the wall of the measuring tube. Most preferably the bracket is comprised of polyetheretherketone (PEEK). A bracket can be easily produced of plastic and represents an optimum isolation of the probe from the wall of the measuring tube due to its poor heat conducting properties. Additionally, plastic has the advantageous property that it dampens oscillations, so that the bracket dampens the oscillations of the probe created by the flowing medium. The bracket can, for example, be produced as an injection molding part or as an essentially rotation-symmetric turning workpiece. Polyetheretherketone has been shown to be a particularly advantageous plastic in this instance. Ceramics, for example, can also be used as an alternative material for the bracket.

For an explosion-proof alternative aspect of the invention, it has been shown to be advantageous that the bracket is comprised of an electrically conducting material, in particular of a conductive plastic. This design has the advantage that different electrical potentials are prevented from occurring between the bracket and the wall of the measuring tube and the dampening of oscillation is simultaneously achieved. Electrically conducting plastics are, for example, plastics that are endowed with conductive substances.

It is preferably provided, by way of non-limiting example, that the probe is glued in the bracket for a reliable mounting of the probe on the bracket. In particular, the probe is glued in the corresponding socket of the bracket. The probe is thus attached to the socket so that it cannot be lost and is reliably held in the bracket.

According to alternative aspect of the invention, it is provided that the bracket is geometrically designed in such a manner that a plurality of brackets can be stacked form-fit on top of one another. This aspect has the advantage that one single type of sensor and one single type of bracket can be used for different measuring tubes with different measuring tube diameters. For example, only one single bracket is necessary for a measuring tube with a large diameter to position the sensor in the channel of flow of the measuring tube. However, it is necessary for a measuring tube with a smaller diameter that a plurality of brackets are stacked on top of one another so that the brackets act as spacers and the probes having a consistent length can be used with smaller measuring tube diameters. In this instance, the brackets are designed in such a manner that the molding on the bracket intended for the engagement in the corresponding recess in the wall of the measuring tube can engage exactly in a recess provided for it of a second bracket during stacking, so that an arbitrary number of brackets can be stacked on top of each other. Preferably, at the most two or three brackets are stacked on each other.

The present invention is described in the detailed description which follows, with reference to the accompany drawings which show, by way of non-limiting examples, exemplary embodiments of the present invention.

DETAILED DESCRIPTION OF THE INVENTION

Figure 1:
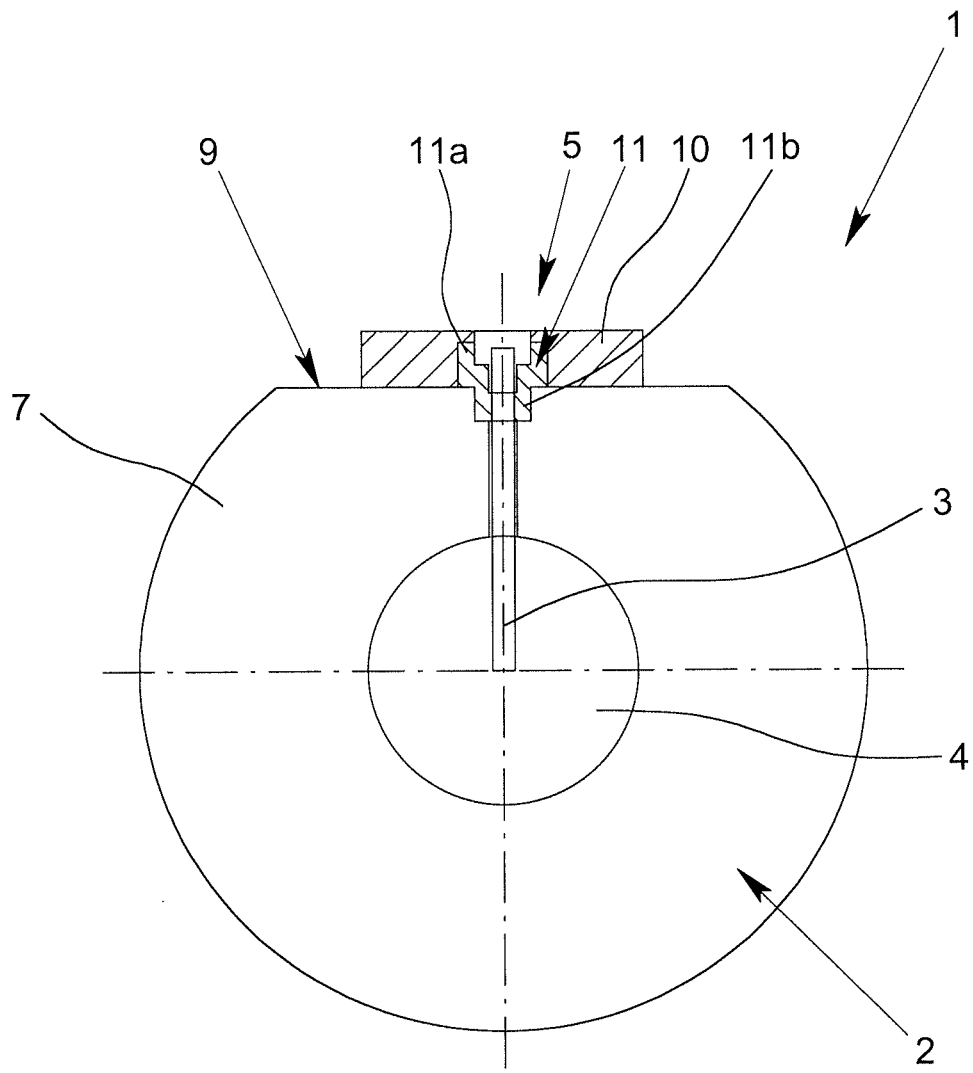
FIG. 1 shows an embodiment of a sensor arrangement that is attached to the measuring tube.

FIG. 1 shows a sensor arrangement 1 for a calorimetric mass flow meter for measuring the mass flow in a measuring tube 2, wherein the sensor arrangement 1 includes two probes 3 arranged one after the other in the direction of flow. The probes 3 are positioned in the cross section of flow 4 of the measuring tube 2 with a bracket 5. The probes 3 are attached in the bracket 5 in such a manner that they are guided without contact with a radial spacing through a probe recess 6 through the wall 7 of the measuring tube 2 into the cross section of flow 4 of the measuring tube 2. The tip of the probes 3 is arranged in the level of the central axis of the cross section of flow 4. The probes 3 are thermally de-coupled from the wall 7 of the measuring tube 2 by means of the bracket 5.

Figure 2:
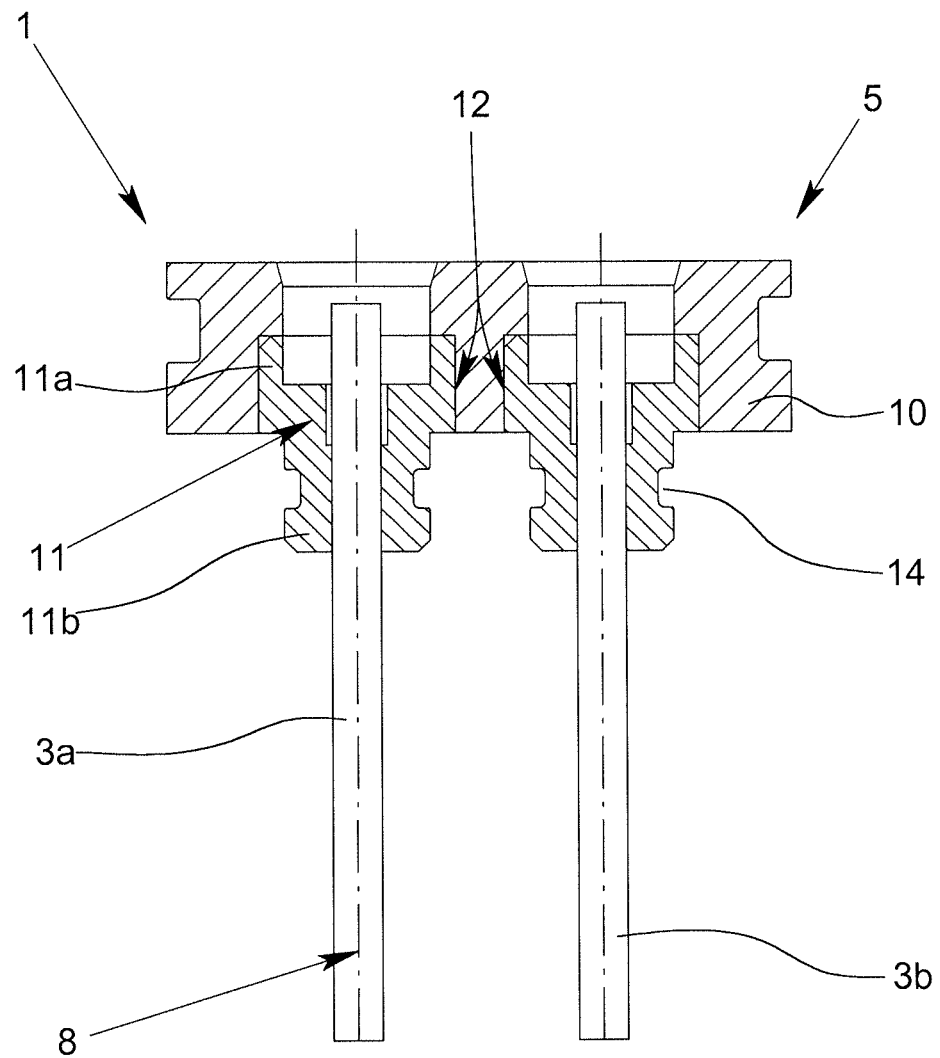
FIG. 2 shows an embodiment of a sensor arrangement having a bracket with a probe attached therein.

FIG. 2 shows a second embodiment of a sensor arrangement for a calorimetric mass flow meter with a first probe 3a and a second probe 3b, wherein the first probe 3a can have a heater for heating its head section 8, so that it emits a heat flow into the medium. The second probe 3b is arranged in a common bracket 5 next to the first probe 3a and is suitable for measuring temperature, in particular the temperature of the flowing medium in a pipeline. There is a temperature-measuring resistor for this within the probe.

A sensor arrangement according to FIG. 2 is shown in FIG. 1 as an example of the sensor arrangement in a mounted state in the measuring tube 2. The measuring tube 2 has a bevel 9 for attaching the bracket 5 in a mounting area. Attaching the bracket 5 on the even bevel 9 is very easy compared to attaching the bracket 5 to a normally curved surface of a measuring tube 2. The bracket 5 shown in FIGS. 1 & 2 is designed with multiple parts and consists of a base plate 10, wherein a number of sockets 11—for example in this embodiment two sockets—corresponding to the number of probes 3 are arranged in the base plate 10. FIG. 2 shows that the probes 3 are attached centrally in the rotational-symmetrically designed sockets 11. By way of non-limiting example, the probes may be glued into the sockets. The sockets 11 are inserted form-fit in a corresponding socket recess 12 in the base plate 10.

FIG. 1 shows that the upper part 11a of the socket 11 is inserted in a corresponding socket recess 12 in the base plate 10 and the lower part 11b of the socket 11 is inserted in a corresponding recess in the wall 7 of the measuring tube 2, so that the socket 11 represents a connecting member between the base plate 10 and the measuring tube 2. The recess for the lower part 11b of the socket 11 in the measuring tube 2 is positioned coaxially to the probe recess 6, so that the recess continues as a probe recess 6. Thus, the socket 11 guarantees an exact positioning of the probes 3 in the probe recess 6 in the wall 7 of the measuring tube 2. The socket 11 is affixed by the base plate 10. By way of non-limiting example, the bracket 5, i.e., the base plate 10 and the sockets 11, in the shown embodiments is made of polyetheretherketone (PEEK). The sockets 11 and the base plate 10 are constructed rotational-symmetrically in respect to their outer contour, so that they are simple to produce. FIG. 1 shows an ideal case of the positioning of the probes 3 through the bracket 5, namely, in such a manner that the lower end of the probes 3 is arranged exactly in the middle of the cross section of the flow 4 of the measuring tube 2. This positioning of the probes 3 allows for an optimum measurement result to be achieved.

Figure 3:
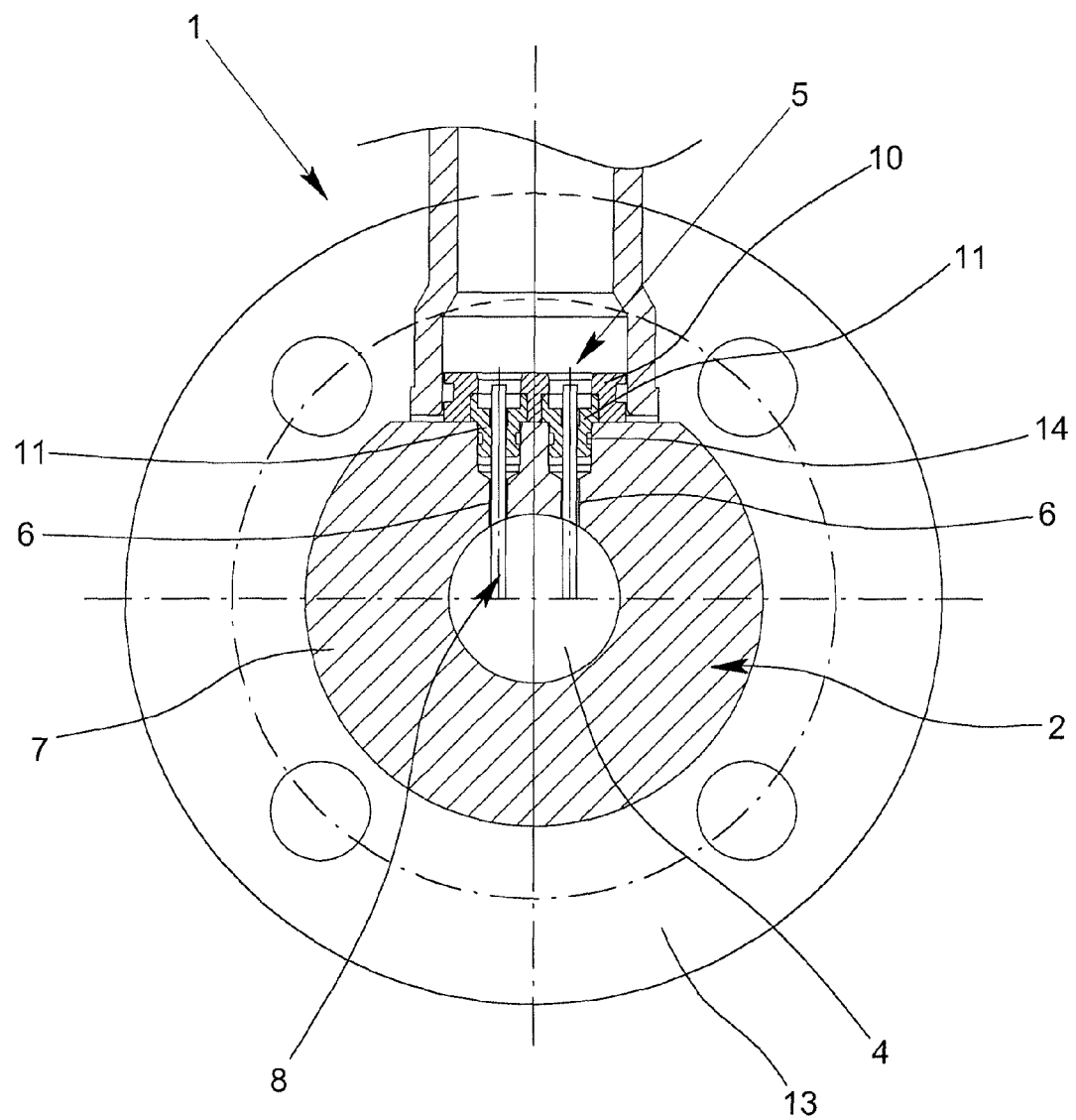
FIG. 3 shows another embodiment of a sensor arrangement with two probes and one measuring tube.

FIG. 3 shows an embodiment of a sensor arrangement 1 for a calorimetric mass flow meter, in which the probes 3 are arranged transversely to the direction of flow within the cross section of the flow 4 of the measuring tube 2. The first probe 3a can be heated in this embodiment in its head region 8, so that a heat flow can be emitted into the medium flowing through the cross section of the flow 4 of the measuring tube 2. The second probe 3b is used for measuring a reference temperature and is equipped with a temperature-measuring resistor. Both probes 3 are inserted into the cross section of the flow 4 next to each other by two separate probe recesses 6 through the wall 7 of the measuring tube 2 and are held by a bracket 5 with a common base plate 10, and in each case to each socket 11 corresponding to the probes 3.

The measuring tube 2 is additionally surrounded by a cladding tube 13. The probes 3 in this embodiment are held in the bracket 5 in such a manner that they are lead through the respective probe recess 6 with radial spacing in order to avoid immediate contact with the wall 7 of the measuring tube 2, and are thermally de-coupled from the wall 7 of the measuring tube 2 so that no or only a very small heat flow occurs between the probes 3 and the wall 7 of the measuring tube 2. The sockets 11 are each equipped with a circumferential annular gap 14, e.g., an o-ring seal can be placed so that a seal occurs between each socket 11 and the wall 7 of the measuring tube 2, such that no medium can leak out of the measuring tube 2 through the probe recess 6. The connection between each socket 11 and the probes 3 is a sealing connection, since the probes 3, by way of non-limiting example, are glued into the sockets 11.

Figure 4:
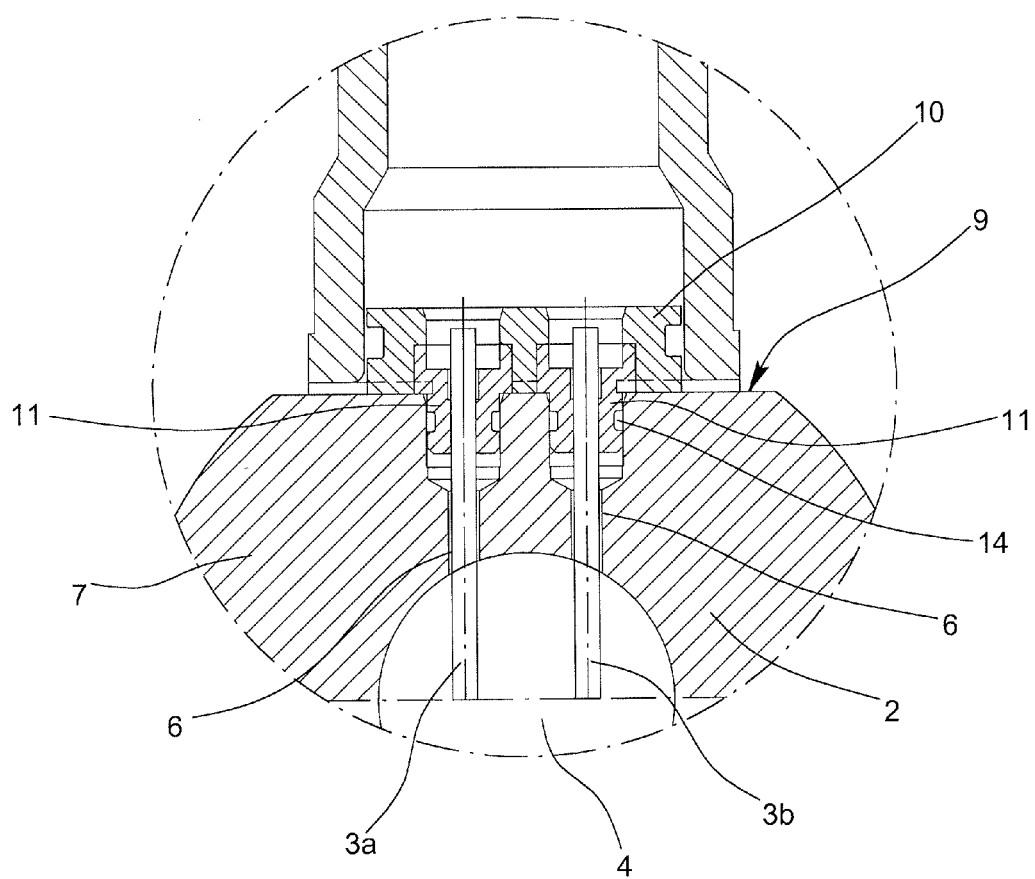
FIG. 4 shows a detailed representation of the embodiment according to FIG. 3.

FIG. 4 shows an enlargement of a section of the embodiment according to FIG. 3. The sockets 11 are inserted in the base plate 10 as well as in the wall 7 of the measuring tube 2, and thus represent a connecting member between the base plate 10 and the measuring tube 2. The sockets 11 are used for exactly positioning the probes 3 within the probe recesses 6 in the wall 7 of the measuring tube 2, and further for thermally de-coupling the probes 3. The probes 3, in this embodiment, are positioned in the probe recesses 6 in such a manner that they are inserted into the cross section of the flow 4 of the measuring tube 2 through the probe recesses 6 with radial spacing such that the probes 3 avoid coming into contact with the wall 7 of the measuring tube 2.

Figure 5A:
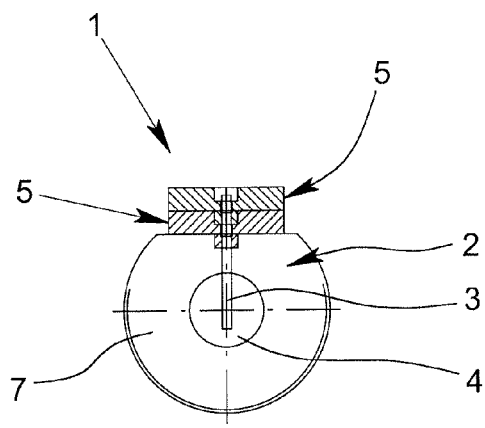
FIG. 5a shows another embodiment of a sensor arrangement on a measuring tube with brackets stacked on one another.

FIG. 5a shows an embodiment of a sensor arrangement 1 mounted in a measuring tube 2 with a small diameter. Since, preferably, uniform brackets 5 and uniform probes 3 are used for all measuring tube diameters, it is provided in this embodiment for positioning the probes 3 in the cross section of the flow 4 of the measuring tube 2 that the probes 3 are positioned by two brackets 5 stacked on one another. Specifically, because the probes 3 are actually too long for the diameter of the measuring tube 2, the greater spacing that is implemented by both brackets 5 acts to properly position the probes 3 in the cross section of the flow 4. The brackets 5 are geometrically designed in such a manner that the bracket 5 with its sockets 11 can be inserted in a recess in the wall 7 of the measuring tube 2 as well as in a corresponding recess in the upper side of a second bracket 5, so that it is possible to easily stack multiple brackets 5.

Figure 5B:
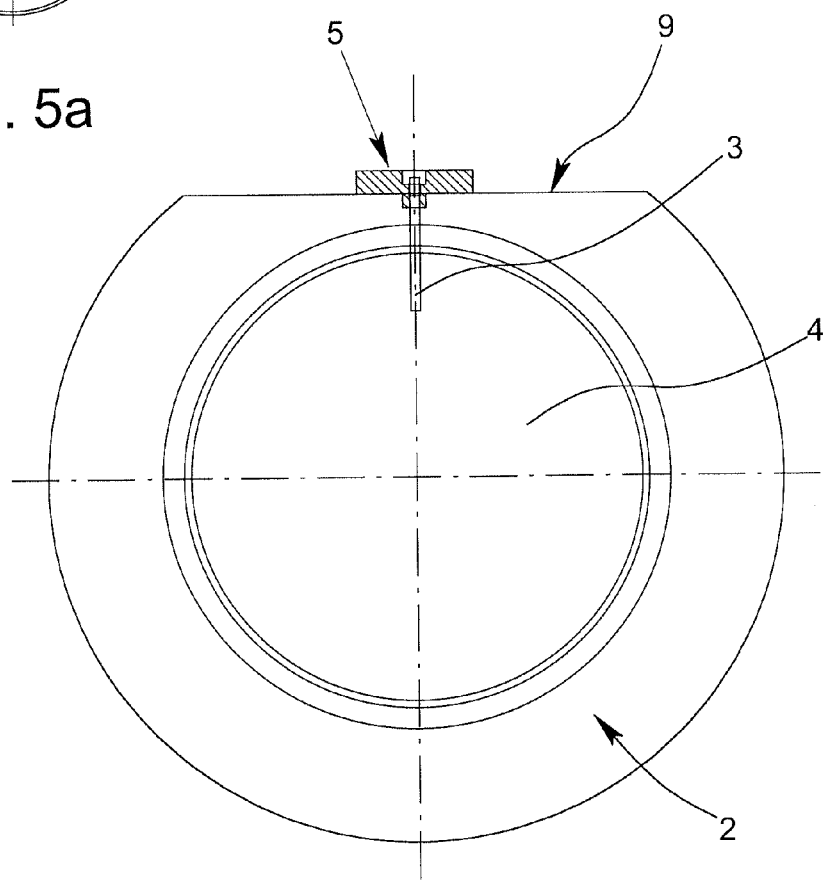
FIG. 5b shows another embodiment of a sensor arrangement on a measuring tube with a large measuring tube diameter.

FIG. 5b shows, as opposed to the representation in FIG. 5a, an embodiment of a sensor arrangement 1 mounted in a measuring tube 2 with a very large diameter, so that the probe 3 that is held by one, single bracket 5 only extends into the cross section of flow 4 in the upper area. The probe 3 in this embodiment has a size identical to the probe shown in the embodiment of FIG. 5a. However, in this embodiment, i.e., with a much larger measuring tube diameter, only one single bracket 5 is used for attaching the probe 3 since an adjustment of the penetration of the probe 3 is not necessary for the large diameter of the measuring tube 2. The embodiment in FIG. 5b additionally includes the feature that, as opposed to the embodiment in FIG. 1 in which two probes 3 are arranged after one another, only one probe 3 is clasped in the bracket 5, so that the knowledge of a reference temperature or, respectively, the fluid temperature is required for evaluating the mass flow with this arrangement.

What is claimed is:

1. A sensor arrangement for a calorimetric mass flow meter for measuring mass flow in a measuring tube, the sensor arrangement comprising:

two probes positioned in a cross section of a flow-through area of the measuring tube; and a bracket for mounting the two probes in such a manner that the two probes are guided essentially without contact with a radial spacing through two probe recesses in a wall of the measuring tube so as to be positioned in the cross section of the flow-through area of the measuring tube in a mounted state thereof, wherein the bracket is constructed in a manner that thermally decouples the two probes from the measuring tube by said bracket being made of a material that is a poor heat conductor, wherein a first probe of said two probes has a heater for heating at least a head section thereof and a second probe of said two probes is a temperature measuring probe, wherein the bracket comprises a base plate having two socket recesses and two sockets therein;

wherein said two sockets are shaped to be at least partially form-fit into said two socket recesses in said base plate; and wherein each of said two sockets hold a respective one of said two probes, wherein each socket has at least a lower part positioned in a corresponding recess in said wall of said measuring tube, wherein each of said two sockets is a connecting member connecting between said base plate and said wall of said measuring tube in the mounted state thereof, and wherein each corresponding recess for said lower parts of said two sockets being positioned coaxially relative to one of said two probe recesses.

2. The sensor arrangement according to claim 1, wherein the bracket is mountable on an outer surface of the measuring tube.

3. The sensor arrangement of claim 2, wherein the measuring tube has a bevel in a mounting area of the outer surface for mounting the bracket.

4. The sensor arrangement according to claim 1, wherein the material is a plastic.

5. The sensor arrangement according to claim 1, wherein the bracket is made of an electrically conducting material.

6. The sensor arrangement of claim 5, wherein the electrically conducting material is a conductive plastic.

7. The sensor arrangement according to claim 1, wherein the two probes are glued into the bracket.

8. The sensor arrangement according to claim 1, wherein the bracket is geometrically shaped such that a plurality of brackets can be stacked in a form-fit manner on top of one another.

9. The sensor arrangement of claim 1, wherein said two sockets and said base plate have a rotationally-symmetrical outer contour.

* * * * *